United States Patent [19]

Rust

[11] 4,330,716
[45] May 18, 1982

[54] AUTOMATIC VEHICLE HEADLIGHT CONTROL SYSTEM

[76] Inventor: Bob Rust, 1073 Hampton Rd., Daytona Beach, Fla. 32014

[21] Appl. No.: 190,052

[22] Filed: Sep. 23, 1980

[51] Int. Cl.³ .............................................. H02J 1/00
[52] U.S. Cl. ............................................... 307/10 LS
[58] Field of Search .................................. 307/10 LS

[56] References Cited

U.S. PATENT DOCUMENTS 3,500,119  3/1970  Price ......................... 307/10 LS X
4,011,460  3/1977  Kniesly et al. ................ 307/10 LS Primary Examiner—Michael L. Gellner
Attorney, Agent, or Firm—Cushman, Darby & Cushman

[57] ABSTRACT

An auxilliary automobile headlight and taillight switching system which is responsive to the operation of the windshield wiper motor and the vehicle alternator for controlling the energization of the low beam headlights and taillights. The system includes a relay circuit which includes a single relay connected under the hood of the vehicle across the wiper motor, so that when the alternator is operating a current will be developed through the coil sufficient to energize the relay to connect the low beam headlights and taillights directly to the automobile battery.

11 Claims, 3 Drawing Figures

AUTOMATIC VEHICLE HEADLIGHT CONTROL SYSTEM

FIELD OF THE INVENTION

The present invention relates generally to systems for automatically turning on the headlights and taillights of a motor vehicle when the windshield wipers are turned on. In particular, the invention relates to a device which automatically turns on the headlights and taillights with the windshield wipers only when the vehicle's engine is running.

BACKGROUND AND SUMMARY OF THE INVENTION

A majority of states now have in effect traffic laws requiring headlights and taillights to be turned on when driving in the rain. In order to simplify drivers' compliance with such laws, a number of circuits have been designed which automatically turn on the headlights and taillights when the windshield wipers are turned on. U.S. Pat. Nos. 3,500,119, 3,519,837, 3,767,966, 3,600,596, 3,591,845, 4,057,742, 3,909,619, 4,097,839, and 3,824,405 disclose such devices. All of these devices have generally proved impractical because they are exceedingly expensive to manufacture, overly time consuming to install, unreliable in operation and/or cause inconvenience during use. For example, U.S. Pat. No. 3,500,119 issued to K. Price discloses an automatic headlight control system which uses three relays and must be connected to the headlight and taillight switches. The use of three relays adds considerable expense and complexity to the device, and the switch connections for most foreign and U.S. vehicles can require a number of hours of labor for installation.

The present invention overcomes the shortcomings of prior devices and includes a number of unique and advantageous features. The control system in accordance with the present invention may be easily installed entirely under the hood of any conventional motor vehicle to preexisting terminals and wires without any modifications thereof. The system includes a single relay circuit which, when installed, may be energized to provide electrical power directly to the low beam headlights and the taillights when the vehicle wiper motor is turned on while the vehicle engine is running. The system responds to the increased voltage generated across the windshield wipers by the vehicle's alternator when the engine is running and the windshield wipers are turned on. The system does not interfere with the high and low beam switches of the headlights or with the usual taillight switch. The invention may also be used in emergency vehicles to automatically turn on the low beam headlights when the vehicle's siren or emergency lights are turned on.

Many vehicles today are provided with window washers for cleaning windshield with the wipers and/or intermittent wiper action circuits for turning the wipers on intermittently in a very light rain or mist. Operation of either wiper device would cause prior devices such as is disclosed in Price to intermittently energize and deenergize the headlights and taillights.

This problem may also be overcome by the present invention. In one alternate embodiment of the invention, a delay circuit may be connected into the relay circuit so that the relay will not be energized by a single wipe of the windshield wiper blades, such as would result from operation of either the intermittent action of the wipers or of the window washer. In order to assure that the delay will be temperature independent a temperature sensitive resistive element such as a thermistor is inserted in the relay circuit across the windshield wiper motor.

In accordance with another alternative embodiment of the invention the low beams can be kept on while the vehicle is operating after the windshield wipers are turned off. This is accomplished by using a duel threshold relay and connecting the hot side of the ignition coil to the relay coil through a suitable resistor and thereby providing a current to the relay coil sufficient to keep the relay switches closed and the lights on.

BRIEF DESCRIPTION OF THE DRAWINGS

These and other aspects of the invention may be more fully understood from the following detailed description of the preferred exemplary embodiments when taken with the appended drawings in which.

DETAILED DESCRIPTION OF THE PREFERRED EXEMPLARY EMBODIMENTS

Figure 1:
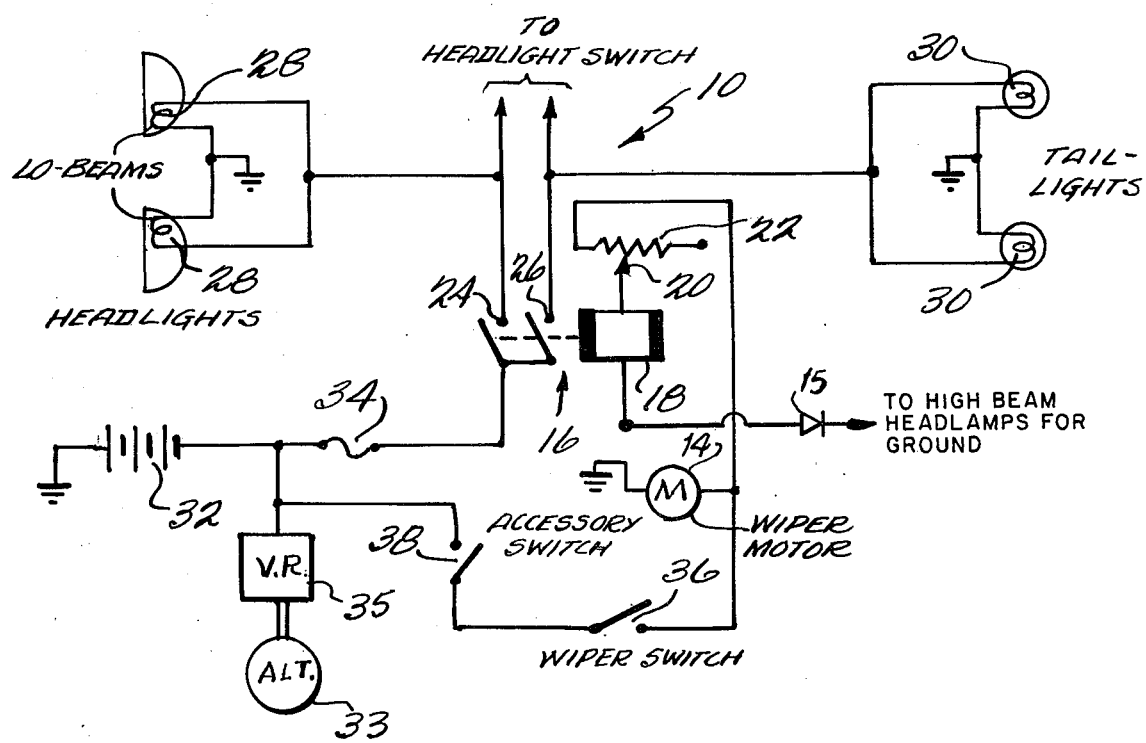
FIG. 1 is a schematic diagram of a first embodiment of the invention.

Referring first to FIG. 1, there is shown a first embodiment of the present invention referred to generally as circuit 10. Circuit 10 includes a potentiometer 22 coupled at one end 17 to the hot side of the vehicle's wiper motor 14 which is in turn connected to the vehicle battery 32 and to the vehicle alternator 33 and voltage regulator 35, through the wiper switch 36 and auxiliary ignition switch 38. A relay 16 having a relay coil 18 is coupled at one side to the cold side of the wiper motor 14 or to ground through a diode 15 and at its other side to the wiper 20 of potentiometer 22 to complete a loop composed of wiper motor 14, diode 15, coil 18 and potentiometer 22. Relay 16 also includes relay contacts 24 and 26 which, when closed, respectively connect the low beam headlights 28 and the taillights 30 of the vehicle to the vehicle battery 32. Low beam headlights 28 and taillights 30 are energized from the battery 32 through a fuse 34 and relay contacts 24 and 26. The entire circuit may be mounted and connected under the hood of the vehicle to existing electrical contacts and wires. For example, relay contacts 24 and 26 may be connected into the wires respectively leading from the low beam headlights and taillights to the usual headlight switch.

When wiper motor 14 is operating but the engine is not running, the voltage developed across the wiper motor 14 is limited to the battery voltage, e.g. 12 volts. When the engine is running, the alternator 33 produces a larger voltage across the wiper motor 14, e.g. 14 volts. By proper selection and calibration of the relay 16 and potentiometer 22, the voltage developed across the wiper motor 14 by the alternator 33 when the engine is running will be sufficient to close relay 16 while the voltage developed when the engine is not running will not close relay 16.

An optional use of the invention shown in FIG. 1 is available for emergency vehicles. On emergency vehicles such as police cars and fire engines, it is ordinarily necessary to turn on separate switches to activate the siren, emergency lights and headlights. However, if the vehicles siren and/or emergency lights are connected to the hot side of the wiper motor, the low beam headlights and taillights may be automatically turned on with the siren and/or emergency lights, thus saving the driver an extra step.

Figure 2:
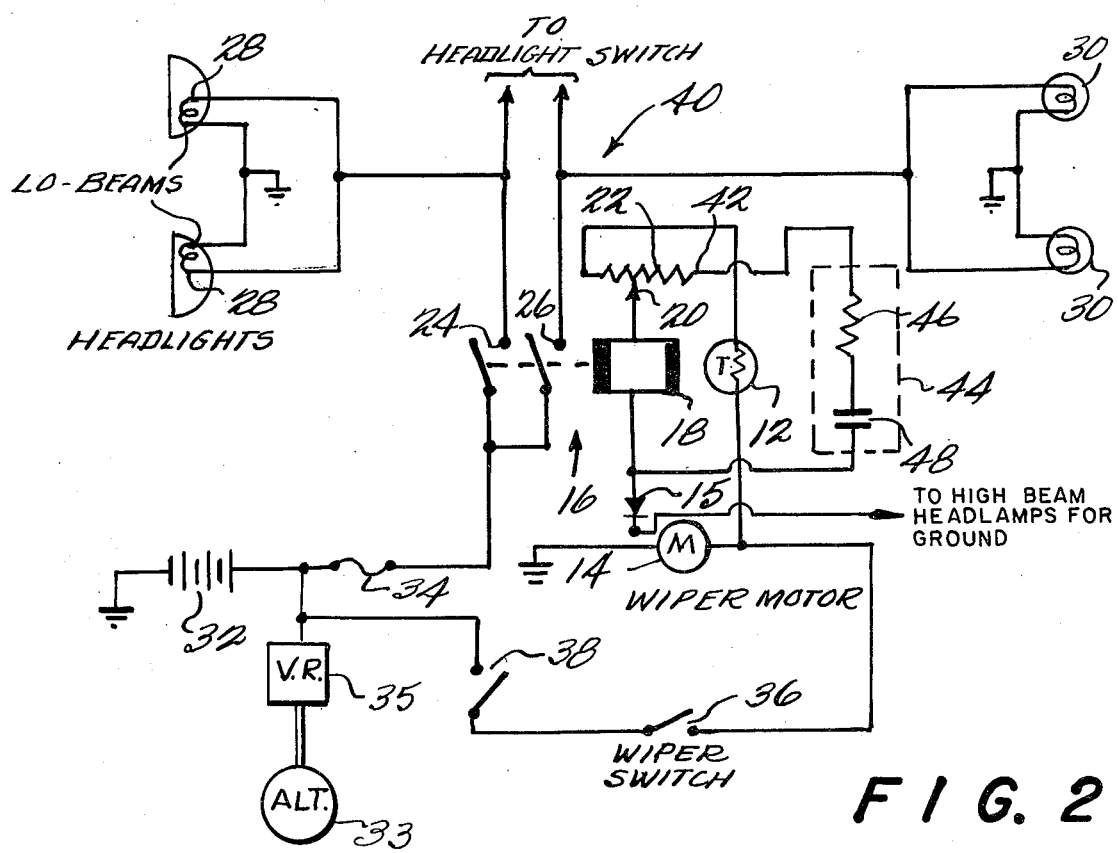
FIG. 2 is a schematic diagram of a second embodiment of the present invention.

The second embodiment of the present invention shown in FIG. 2 and identified generally by the numeral 40, is substantially identical to that shown in FIG. 1, except that the opposite end 42 of potentiometer 22 is connected to the cold side of relay coil 18 (or to ground) through a delay circuit 44, suitably composed of a resistor 46 and a capacitor 48 and side 17 of potentiometer 22 is connected to the hot side of wiper motor 14 through a temperature sensitive resistor such as thermistor 12. Delay circuit 44 is selected to delay the energization of relay coil 18 for a period in excess of that of one wiping motion of the vehicle windshield wipers. By selecting a thermistor 12 having a resistance which varies with temperature in an inverse proportion to the resistance of the relay coil 18, the delay constant of delay circuit 44 will be constant irrespective of the engine temperature and climatic conditions. This embodiment is particularly well adapted for use on vehicles having automatic intermittent windshield wiper action systems and windshield washer systems, since it would generally not be desired to turn on the vehicle lights when these mechanisms are being utilized.

The elements of the present invention illustrated in FIG. 2 were found to operate properly on an American made automobile having a 12-volt battery when their characteristics were chosen as follows: the thermistor 12 had a resistance of 40 ohms when cold (70° F.) and 30 ohms elements when hot (200° F.). A 20 amp fuse, 20 amp relay contacts and a 200 ohm, 5 watt potentiometer were used. Relay coil 18 had a resistance of 90 ohms when cold and 100 ohms when hot. The delay resistor 46 had a resistance of 220 ohms and a 0.5 watt rating and the delay capacitor 48 has a 2200 mfd. capacitance and a 16 volt rating.

Thermistor 12 also serves another important function. As noted above, without thermistor 12 in the relay circuit (see FIG. 1), the resistance of coil 18 and thus the total resistance to current through that coil, increases with temperature. Since the temperature will increase when the engine is turned on, the current that would otherwise be available to the relay coil, and therefore the differential between the respective currents through the coil when the engine is on and when the engine is off, is reduced. A more exact calibration of the potentiometer 22 is therefore required to assure that the relay is closed only when the engine and wiper motor are running. The thermistor 12, however, keeps the total resistance to current through the relay coil 18 independent of temperature so that the full impact of the increase in voltage generated by the alternator when the engine is on will be reflected in the increased current through the relay coil 18. In fact, in applications where the delay feature is unimportant or not critical, a thermistor of sufficient sensitivity (e.g. 125 ohms at 70° F., 30 ohms at 200° F.) would permit the system to operate correctly even when the alternator is not producing a voltage in excess of the battery voltage.

Figure 3:
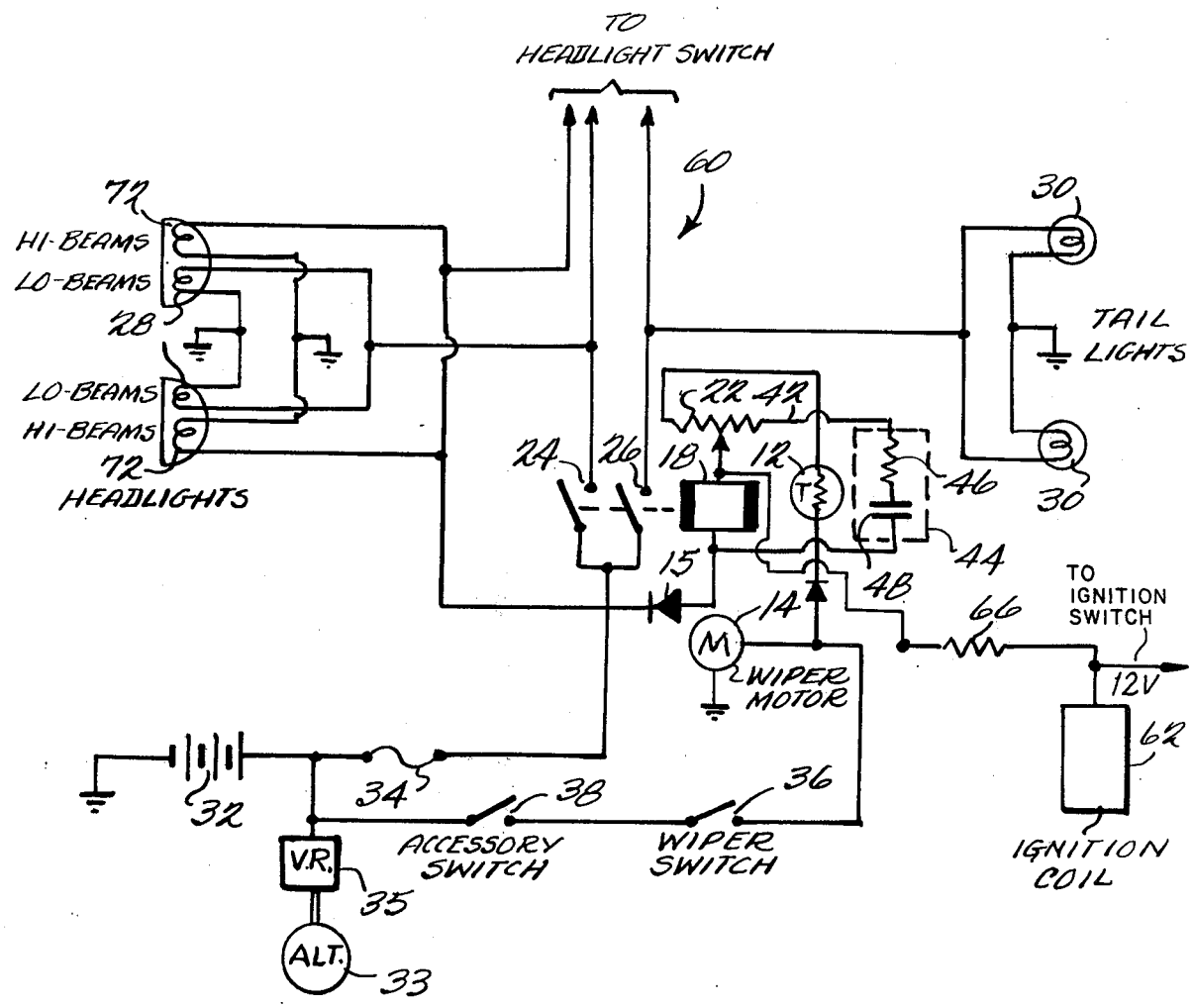
FIG. 3 is a schematic diagram of a third embodiment of the invention.

FIG. 3 shows an embodiment of the present invention, generally identified by the numeral 60, which maintains energization of the relay coil to keep the low beam headlights and taillights on even when the windshield wipers have been turned off, provided that the engine continues running. This feature is particularly useful when a driver begins a trip during the day when it is raining and continues the trip into the nighttime during which time the rain stops and the windshield wipers could safely be turned off. This feature of the invention avoids the possibility of a driver forgetfully turning off the windshield wipers, and thus the headlights and taillights, before turning on the vehicle's conventional light switch.

A second feature of the embodiment shown in FIG. 3 automatically opens the relay and thus turns off the low beam headlights when the wiper motor and engine are running if the high beam headlights are turned on by use of the conventional vehicle dimmer switch. It will be observed that the latter feature is simply an alternate hookup of the terminals of the present invention and may therefore be accomplished with any of the embodiments shown in FIGS. 1, 2 or 3.

In accordance with the embodiment shown in FIG. 3, the control system 60 is structurally identical to that shown in FIG. 2 except that it is essential that the relay switch 24, 26 has a threshold current for closing $I_1$ which is higher than its threshold current for opening $I_2$. (This is a feature of most conventional relays.) The hot side of the wiper motor 14 is coupled to the vehicle's ignition coil 62 through a resistor 66. The resistance of resistor 66 is chosen so that when the ignition coil 62 is energized and the vehicle windshield motor 14 is inoperative, the current through the relay coil will have a value $I_3$ which is between $I_1$ and $I_2$. Thus, when the relay 16 is not energized, $I_3$ will be insufficient to energize it and turn on the low beam headlights and taillights. On the other hand, when the relay is energized and the wiper motor is subsequently turned off, the current generated through coil 18 from the ignition coil is sufficient to maintain relay 18 in its closed position. When used with the elements having the characteristics described with respect to FIG. 2, it is been found that a resistance in resistor 64 of 100 ohms causes the device to operate properly.

In accordance with the alternate hookup of the system of the present invention, shown in FIG. 3, the cold side of relay coil 18 may be connected to the high beam headlights through diode 15 rather than to the cold side of the wiper motor or ground as in the hookups shown in FIGS. 1 and 2. When the high beam headlights 72 are turned on with the vehicles conventional headlight switch, the voltage across the high beam headlights 72 will generate a voltage at the cold side of the relay coil 16, thereby reducing the voltage across coil 16 and opening the relay 18 to thereby turn off the low beam headlights 28. This alternate connection, like those described above, are easily made from beneath the hood of the vehicle.

It will be appreciated by those of ordinary skill in the art to which this invention pertains that although only 3 exemplary embodiments of the invention have been hereinabove descrived, there are many modifications which may be made fully within the scope of the invention, limited only by the appended claims.

What is claimed is:

1. An electrical control system for use in a vehicle having an engine, a voltage source, including a battery and an alternator connected to a windshield wiper motor by a wiper control switch, the alternator including means for providing a current to said wiper motor in excess of the voltage rating of said battery, and vehicle headlights and taillights, said control system comprising:

means, responsive to the operation of said windshield wiper motor, for automatically electrically connecting said voltage source to said headlights and said taillights to energize said headlights and said taillights only when said engine is running.

2. An electrical control system for use in a vehicle having an engine, a voltage source, including a battery and alternator connected to a windshield wiper motor by a wiper control switch, the alternator including means for providing a current to said wiper motor in excess of the voltage rating of said battery, and vehicle headlights and taillights, said control system comprising:

means, responsive to the operation of said windshield wiper motor, for automatically electrically connecting said voltage source to said headlights and said taillights to energize said headlights and said taillights only when said alternator is operating.

3. A system as in claim 1 wherein said connecting means comprises a first switch and a second switch, each closable in response to a given magnetic force, and relay means, responsive to the the voltage across said wiper motor, for closing said first and second switches.

4. A system as is claim 3, wherein said system is disposed in the engine compartment of said vehicle, said relay means including a relay coil having a resistance which varies directly with the temperature in said compartment, said system further comprising delay means for delaying the energization of said relay means when said wiper motor is turned on for a length of time which is independent of said temperature, said delay means including a thermistor, series connected to said relay coil, having a resistance which varies inversely with said temperature.

5. A system as in claim 4 wherein said delay means further comprises a delay element consisting of a resistor, and a capacitor series connected to said resistor, said delay element being connected across said relay coil.

6. A system as in claim 4 wherein said vehicle comprises an ignition coil, said system further comprising means for maintaining energization of said relay means when said wiper motor is turned off, said maintaining means comprising means, responsive to the voltage across said ignition coil, for providing a current to said relay coil.

7. A system as in claim 5 further comprising a potentiometer, series connected between said thermistor and said delay element, having its wiper coupled to said relay coil, for adjusting the current through said relay coil.

8. A system as in claim 5 wherein said delay means comprises first circuit means consisting of first resistor means and capacitor means series connected to said first resistor means;

said system further comprising a potentiometer, series connected between said thermistor and said first circuit means, having its wiper coupled to said relay coil, for adjusting the current through said relay coil; and means for maintaining energization of said relay when said wiper motor is turned off, said maintaining means comprising second resistor means for providing a current, responsive to the voltage across the ignition coil, to said relay coil.

9. An electrical control system for use in a vehicle having an engine, a voltage source connected to a windshield wiper motor by a wiper control switch, and vehicle headlights and taillights, said control system comprising:

means, responsive to the operation of said windshield wiper motor, for automatically electrically connecting said voltage source to said headlights and taillights to energize said headlights and said taillights only when said engine is running.

10. A system as in claim 1 or claim 9 wherein said connecting means comprises a first switch and a second switch, each closable in response to a given magnetic force, and relay means, responsive to the temperature of said engine and the voltage across said wiper motor, for closing said first and second switches.

11. A device as in claim 9 wherein said relay means comprises a thermistor.

* * * * *